Feb. 16, 1954

E. R. PRICE 2,669,329

POWER BRAKE CONTROL

Filed Aug. 9, 1950

Inventor
EARL R. PRICE
By T. J. Plante
Attorney

Feb. 16, 1954  E. R. PRICE  2,669,329
POWER BRAKE CONTROL
Filed Aug. 9, 1950                                                5 Sheets-Sheet 3

Inventor
EARL R. PRICE
By T. J. Plante
Attorney

Inventor
EARL R. PRICE
By T. J. Plante
Attorney

Feb. 16, 1954　　　　E. R. PRICE　　　　2,669,329
POWER BRAKE CONTROL
Filed Aug. 9, 1950　　　　　　　　　　　5 Sheets-Sheet 5

Inventor
EARL R. PRICE
By
T. J. Plante
Attorney

Patented Feb. 16, 1954

2,669,329

UNITED STATES PATENT OFFICE 2,669,329

POWER BRAKE CONTROL

Earl R. Price, South Bend, Ind., assignor to Bendix Aviation Corporation, South Bend, Ind., a corporation of Delaware Original application January 25, 1947, Serial No. 724,453. Divided and this application August 9, 1950, Serial No. 178,481

6 Claims. (Cl. 192—3)

This is a division of parent application Serial No. 724,453, filed January 25, 1947.

This invention relates to power-operated means for actuating brakes, and particularly the power-operated means for controlling the auxiliary applications of the brakes, variously referred to as "parking brakes," and "emergency brakes."

The conventional "emergency" or "parking" brake of automotive vehicles is a hand-operated linkage which actuates either the shoes of the rear wheel brakes or a separate brake provided on the propeller shaft. The present invention is not concerned with the brakes themselves, i. e. with the actual friction stopping mechanism, but with the mode of obtaining auxiliary brake application, regardless of the location and nature of the brake or brakes which are applied for auxiliary purposes.

The present hand lever for obtaining emergency brake actuation is not as conveniently located or as accessible as it should be. Moreover, it could not readily be improved in this respect without interfering noticeably with the comfort of the occupants of the driver's compartment. It is also possible that future changes may be made in the arrangement of the driver's compartment which will render the present hand lever inconvenient, or unsightly, or both. Because of the foregoing reasons, and also for reasons of convenience and driving ease, it would be desirable to provide auxiliary brake actuating mechanism which can be controlled either by a fingertip lever or by a control button.

An object of the present invention is to provide power-operated means for obtaining auxiliary brake actuation, thereby making it possible to utilize a fingertip control lever or a control button, in place of the present large hand lever.

A further object of the present invention is to provide means for automatically actuating and/or releasing the auxiliary brake applying mechanism whenever certain events occur in the operation of the vehicle.

Other objects and advantages of the present invention will become apparent during the following discussion, reference being had therein to the accompanying drawings, in which.

Figure 1:
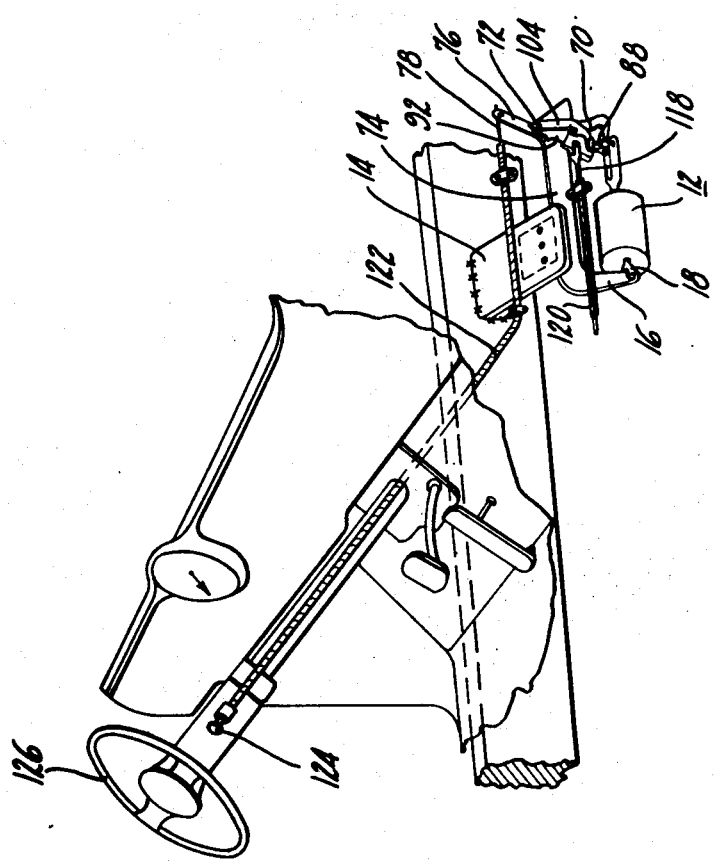
Figure 1 is a diagrammatic view showing a power-operated auxiliary brake actuating mechanism and its manual control.
Figure 2:
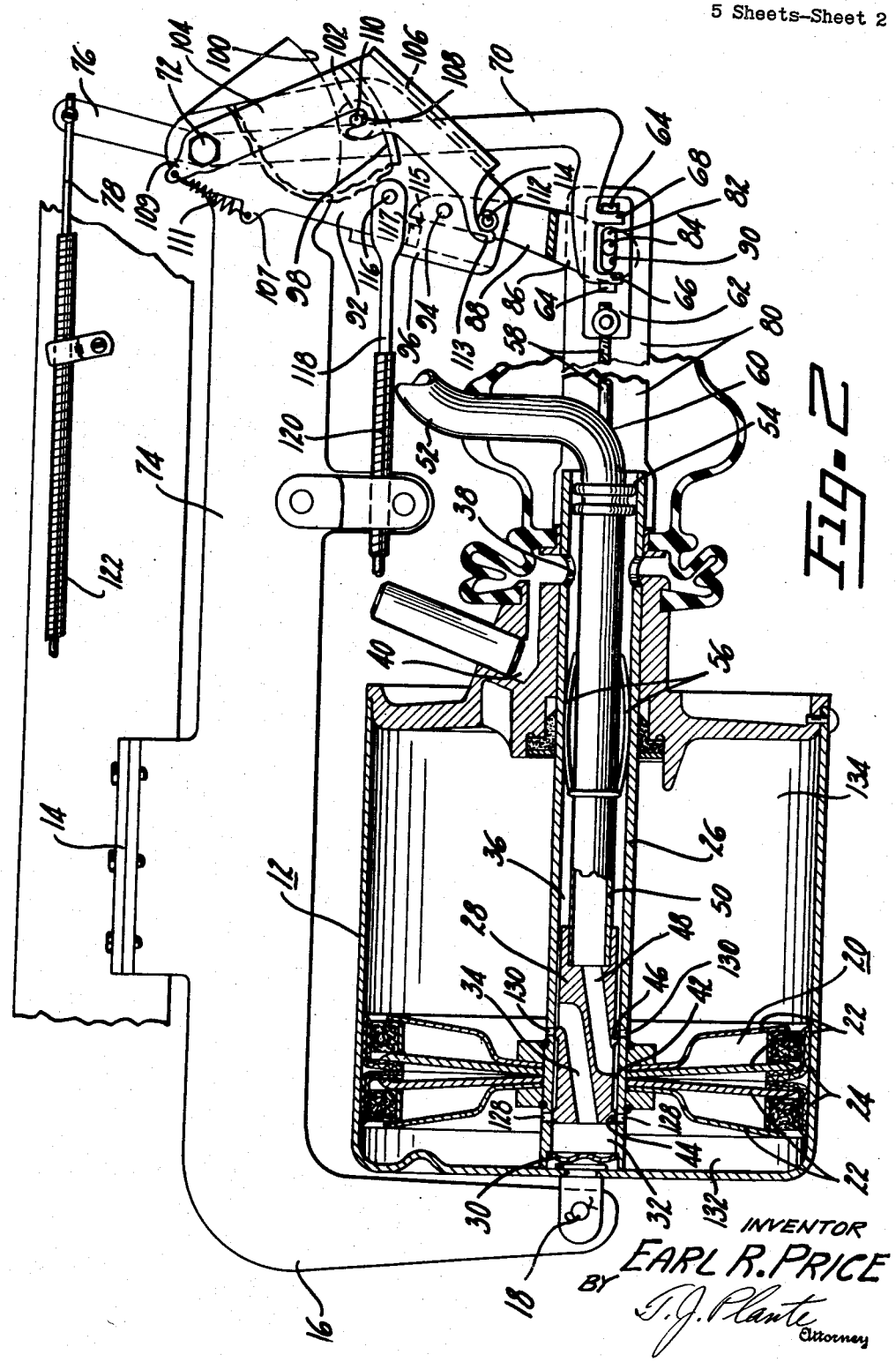
Figure 2 is a part-sectional, part-outline enlarged view of the power actuator and lever system of Figure 1.

Referring to Figures 1 and 2, the auxiliary (or parking) brake control system is illustrated as embodying a simple manual control combined with a power cylinder having an internal control valve mechanism.

The power cylinder 12, which is of the double-acting type (i. e. its piston is urged in either direction solely by a fluid pressure differential), is supported on the vehicle frame by means of a bracket 14 from which depends a supporting arm 16. The casing of the power cylinder is pivotally supported at 18, in order to permit slight pivotal movement which compensates for arcuate movement of the lower end of the power-operated brake lever.

Reciprocal within power cylinder 12 (see Figure 2) is a piston 20, which includes a plurality of plates 22 and suitable sealing members 24 held in position by the plates. The piston 20 is secured by suitable means to a tubular member 26, which extends through an opening in the right end of the cylinder, and which is arranged to transmit operating force to the power-operated lever, whence the force is transferred by suitable means to the brakes.

A sliding valve member 28 is reciprocably mounted inside the tubular member 26, and is so arranged and constructed that its movements relative to the tubular member control the changes in pressure on opposite sides of the piston 20. The left end of tubular rod 26 is closed by a seal 30, and a chamber 32 is provided between the seal 30 and the left end of the valve member 28. The chamber 32 is permanently connected, by means of passage 34 formed in the valve member, with an annular space 36 which is in constant communication through ports 38 (formed in tubular rod 26) and passage 40 with air at atmospheric pressure. An annular chamber 42, which is formed between lands 44 and 46 on the valve member, is permanently connected, by means of passage 48 formed in the valve member, with the interior of a tube 50, which is secured at its left end to the valve member, and which has its right end bent outwardly, as at 52, to form a conduit, which may be connected by a suitable length of hose to a source of vacuum, such, for example, as the usual intake manifold. The right end of the straight portion of tube 50 is supported in tubular rod 26 by means of the collar 54, and an anti-rattle device 56 may be provided intermediate the ends of the straight portion of the tube.

A short rod 58 is secured to the bent side of tube 52 by means of the brazing material 60. The right end of rod 58 is threaded and is adjustably secured to two spaced links 62, only one of which is seen in Figure 2. Extending transversely between, and supported by, the links 62 are two longitudinally spaced abutments 64, which engage the outer edges of the forks 66 and 68 provided on the end of valve-operating lever 70. Lever 70, which is fulcrumed at 72 on the arm 74 of supporting bracket 16, has an upwardly extending arm 76 which is connected to a manually operated cable 78.

A clevis 80, only one arm of which is seen in Figure 2, is secured to the tubular rod 26, and has aligned openings in its arms near the ends thereof, through which extends a pin 84, the pin being a tight fit in the openings. The pin 84 also extends through openings 82 formed in the forked ends 86 (only one of which is seen in Figure 2) of power lever 88. As shown in the drawings, elongated slots 90 are provided in the plates 62 and there is sufficient space between the pins 84 and the forks 66 and 68 of valve lever 70 to provide the required lost motion between valve member 28 and tubular rod 26.

The additional levers associated with power lever 88 are constructed and arranged to provide an automatic locking means for the parking brake. Moreover, the arrangement is such that the locking means can be released by a simple return movement of the power cylinder, without requiring as a preliminary step the application of a releasing force acting in a different direction from the actuating force. A lever 92 is pivotally mounted at 72 and is connected by means of pin 94 to the upper end of lever 88. The lever 92 may, as shown, consist of spaced identical side plates which are integral parts of a sheet metal member folded along the edge 96. Secured to, and extending transversely between, the sides of lever 92 is a plate 98 which has an arcuately curved upper surface, as shown, the arc being eccentric with respect to pivot 72, and being centered at a suitable point left of the pivot. The lower surface 100 of the right end of supporting arm 74 is also arcuately curved, the arc being concentric with pivot 72. A roller 102 is located between the surface 100 and the upper surface of plate 98 and is adapted to engage the two surfaces simultaneously. It will be seen in the drawing, that the two arcuate surfaces tend to diverge at the left end and to converge at the right end.

Movement of the roller 102 is controlled by a lever 104, which is pivoted at 72, and which may, as shown, consist of spaced identical side plates which are integral parts of a sheet metal member folded along the edge 106. Aligned slots 108 are provided in the sides of lever 104 to receive the reduced diameter extensions 110 of the roller 102, enlarged openings being provided in the sides of lever 92 to permit the extensions 110 to pass through. The sides of the slots 108 are, as shown, spaced sufficiently to provide clearance between the extensions 110 and at least one side of the slots, thereby allowing the roller some movement relative to lever 104.

In order to urge the lower ends of levers 104 and 92 apart, and thereby urge roller 102 toward engagement with surfaces 98 and 100, a spring 111 is connected between suitable ears 107 and 109 provided on the two levers. Assuming lever 92 is stationary, spring 111, unless prevented by other circumstances from doing so, urges lever 104 in a counterclockwise direction, thereby causing the left edge of slots 108 to hold the roller in engagement with surfaces 98 and 100. In order to provide means for extending spring 111 when it is necessary to move the roller out of engagement with the wedging surfaces, a pin 112 carried by lever 88 is arranged to at times engage an arm or hook 113 on the end of lever 104. The pin 112 passes through an enlarged opening 114 in lever 92 to permit it to move to and fro without engaging lever 92. Conjoint movement of levers 88 and 92 is nevertheless obtained after a slight initial relative movement by engagement of the upper end 115 of lever 88 with an abutment 117 on lever 92, the abutment being secured between the folded sides of the lever.

A pin 116 connects lever 92 to the end of a cable 118 which leads to the brake, or brakes, the cable being sheathed in a conduit 120. The cable 78, previously referred to, extends through a conduit 122 and terminates in a manual control button 124 which is mounted on the side of the steering column, just under the steering wheel 126.

Operation of the power parking brake control system of Figures 1 and 2 is as follows. When the operator wishes to utilize the auxiliary brake actuating mechanism, he pulls upwardly on the control button 124, thereby pulling cable 78 and turning lever 70 in a counterclockwise direction. The fork 68 of lever 70 pushes against abutment 64 of links 62 to draw tube 50 and valve member 28 toward the right.

In released position, as shown, land 44 covers the ports 128 in tubular rod 26 except for a slight clearance at the left end of the land, and land 46 covers the ports 130 in the rod except for a slight clearance at the right end of the land. With this arrangement, the power cylinder is said to be "atmosphere suspended," since air at atmospheric pressure is present, in released position, on both sides of the piston.

As valve member 28 moves toward the right, ports 128 remain in communication with chamber 32, and ports 130 are brought into communication with chamber 42. Thus chamber 132 of the power cylinder remains connected to the atmosphere, whereas chamber 134 of the power cylinder is connected to the vacuum source. A pressure differential is developed acting over piston 20, and the piston moves toward the right. As the piston and tubular rod 26 move on the brake applying stroke, the rod exerts a force, through clevis 80 and pin 84, on power lever 88. Because the rod 26 follows valve member 28, it will bring the power cylinder to "lapped" or holding position whenever the valve lever 70 ceases to move in the valve-opening direction.

During the initial very brief phase of its movement in the counterclockwise direction, power lever 88 rotates about pivot 94, moving pin 112 toward the right and permitting spring 111 to urge lever 104 in a counterclockwise direction and thereby bring roller 102 into engagement with surfaces 98 and 100. As soon as the upper portion 115 of lever 88 engages abutment 117 further relative movement of levers 88 and 92 is prevented, and they are caused to rotate as a single lever about the pivot 72, drawing cable 118 toward the right and applying the brakes. During this movement of levers 88 and 92, roller 102 is caused by spring 111 to follow-up as surface 98 tends to move away from the roller, the roller remaining in engagement with surfaces 98 and 100.

As long as the operator does nothing to release the brakes, they will automatically remain in frictional engagement because of the locking action of the roller and the system of levers. This locking action is present because the reaction force on cable 118 tending to move it to the left, instead of releasing roller 102, urges lever 92 into tight wedging engagement with the roller, thus providing a positive locking action. The tendency of the cable reaction to cause tighter engagement of the roller results from the fact that any tendency of lever 92 to rotate in a clockwise direction tends to draw the right end of surface 98 into engagement with the roller, and the brake reaction force tending to rotate the roller tries to roll it up the inclined surface 98 in such a way as to increase the wedging force.

As long as the button 124 is left in its upward position, the power cylinder piston remains in its applied, or rightward, position because there is no pressure differential or spring force urging it toward retracted position. Therefore the brakes remain locked without any further attention from the operator.

When the operator wishes to release the parking brakes, he pushes button 124 downwardly. This pushes cable 78 and causes lever 70 to turn in a clockwise direction. The fork 66 on the end of the lever, pushing against the leftward abutment 64, moves valve member 28 toward the left, causing ports 128 to communicate with vacuum chamber 42, while ports 130 remain in communication with the atmosphere. A differential pressure is developed acting on piston 20 to move it toward the left.

As the piston moves toward the left it rotates lever 88 in a clockwise direction, releasing the brake locking device. This occurs because pin 112 moves lever 104 in a clockwise direction against the action of spring 111, and simultaneously exerts a force through pin 94 and lever 92 to release the load on the roller. The roller moves out of wedging position, and the brakes are returned to released position by their return springs, drawing cable 118 and lever 92 toward released position. If the power piston is caused to stop before the brakes are fully released, they will be locked again because lever 92 will overtake lever 88 and again wedge the roller. Further leftward movement of the power piston will, of course, release the lock again.

Figure 3:
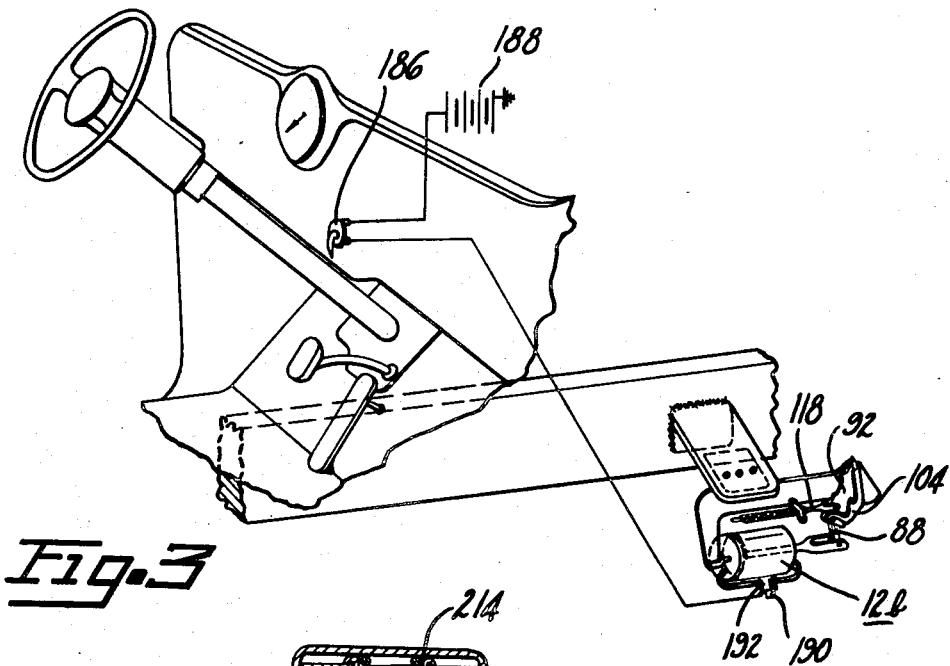
Figure 3 is a diagrammatic showing of a modification of the power parking brake arrangement.
Figure 4:
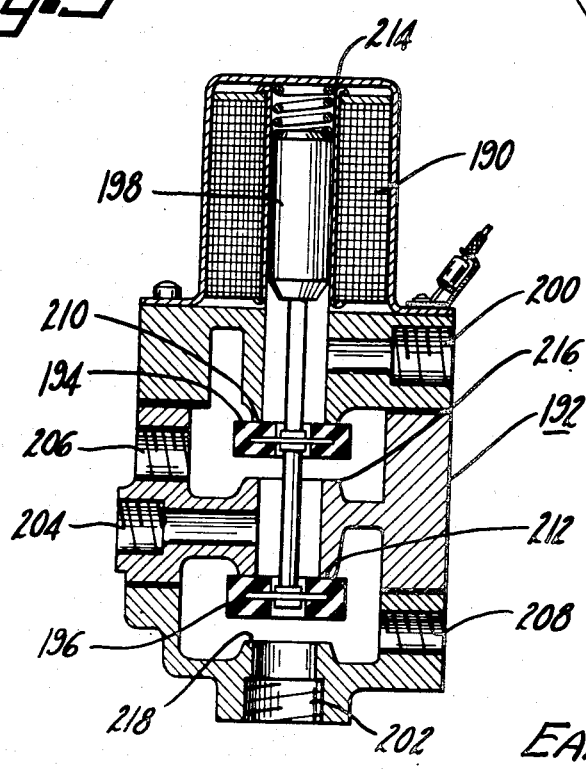
Figure 4 is an enlarged sectional view of the control valve of Figure 3.

Figures 3 and 4 show a power parking brake arrangement in which the operation of the brakes is controlled electrically. A manually operable switch, such as the ignition switch 186, is included in an electrical circuit with a battery 188 and a solenoid 190. The solenoid controls a valve 192, which in turn operates the power cylinder 12b. The power cylinder is double-acting as in the previous version, and the leverage arrangement 88—92—104 is the same as before.

The control valve 192, which is shown in section in Figure 4, includes poppets 194 and 196, which are connected to, and movable with, the armature 198 of the solenoid. The casing of the control valve has two ports 200 and 202 which open to the atmosphere. Port 204 is connected to the vacuum source, port 206 is connected to the left end of the power cylinder, and port 208 is connected to the right end of the power cylinder.

As long as the ignition switch 186 is turned on, the solenoid 190 is energized, and the armature is held in its upward position as shown, poppet 194 being seated at 210, and poppet 196 being seated at 212. Thus the left end of the power cylinder is connected to vacuum, and the right end of the power cylinder is connected to atmosphere.

When the ignition switch is turned off, the solenoid is de-energized and spring 214 moves armature 198 downwardly, seating poppet 194 at 216, and poppet 196 at 218. This connects the right end of the power cylinder to vacuum and the left end to atmosphere, with the result that the cylinder moves on its brake applying stroke. Operation of the power cylinder and locking device is the same as before.

When the switch 186 is again turned on, the solenoid is energized and the parts are returned to their original position.

Figure 5:
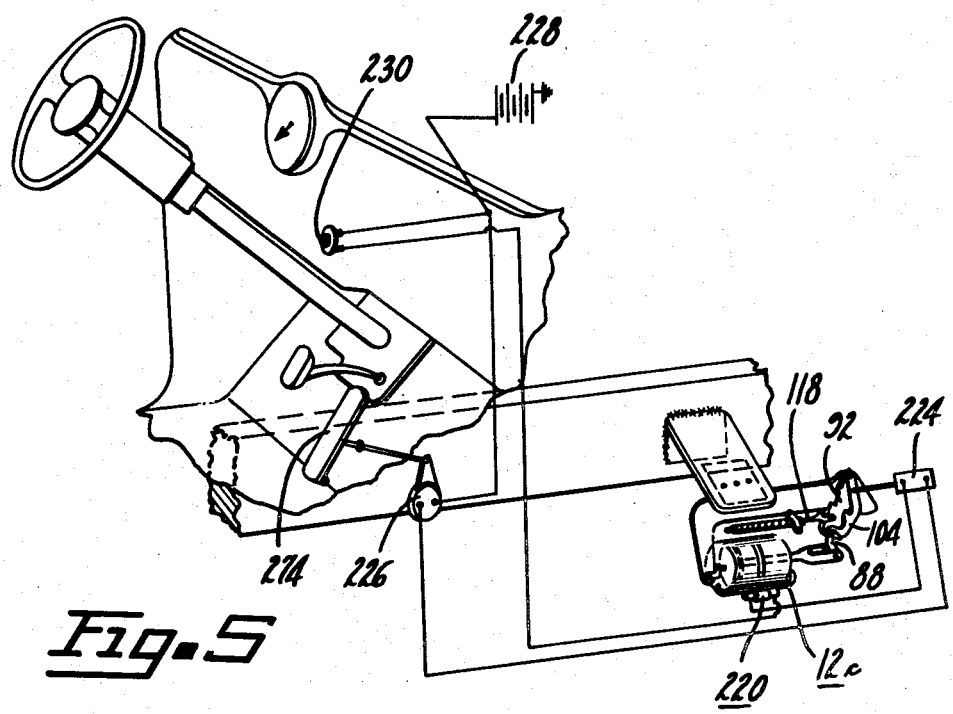
Figure 5 is a diagrammatic showing of another modification of the power parking brake arrangement.
Figure 6:
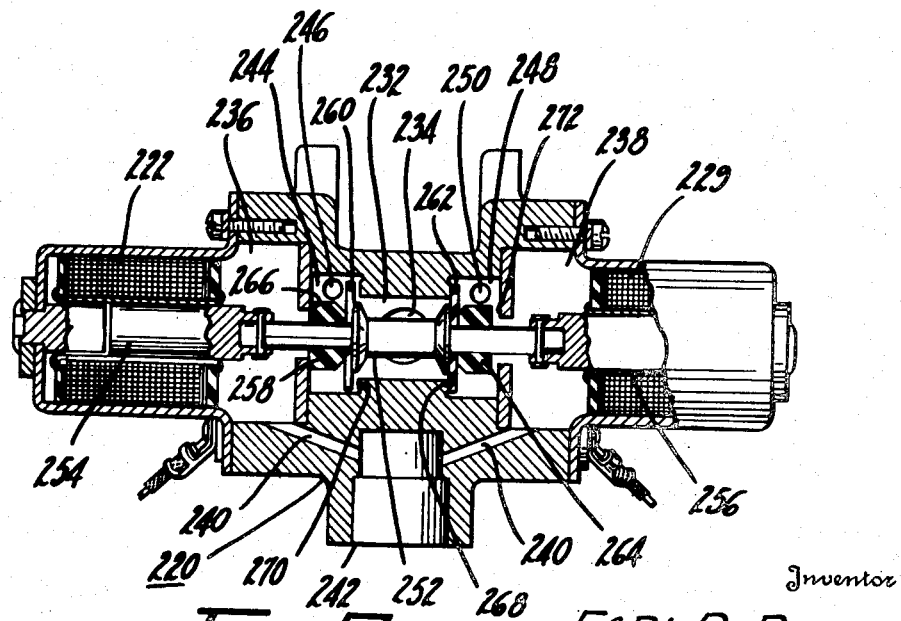
Figure 6 is an enlarged sectional view of the control valve of Figure 5.

Figures 5 and 6 show a parking brake control arrangement which is electrically operated, and which incorporates certain automatic features. The power cylinder 12c and the levers 88—92—104 are the same as before. The power cylinder is controlled by a valve 220 having two solenoids associated therewith. The valve 220 is shown in section in Figure 6. The left hand solenoid 222 is part of an electrical circuit which includes an automatic switch 224, an accelerator operated switch 226, and battery 228. The right hand solenoid 229 is part of an electrical circuit which includes a manually operated button switch 230 and battery 228. The casing of valve 220 has a central chamber 232 which is connected to vacuum by means of port 234, and two end chambers 236 and 238, which are connected to atmosphere by means of passages 240 and port 242. A chamber 244 is provided, which is connected by means of port 246 to the left end of power cylinder 12c. A chamber 248 is connected by means of a port 250 to the right end of power cylinder 12c. A rod 252, which is connected at one end to armature 254 of solenoid 222 and at the other end to armature 256 of solenoid 229, carries poppet valve elements 258, 260, 262 and 264.

In released position, the accelerator switch 226, the automatic switch 224, and the button switch 230 are all open. The control valve parts are in the positions shown in Figure 6, in which the left end of power cylinder 12c is connected to vacuum through chambers 244 and 232. The right end of the power cylinder is connected to atmosphere through chambers 248 and 238.

When the operator wishes to obtain actuation of the parking brakes, he presses the button 230, which energizes solenoid 229, drawing armature 256 and rod 252 toward the right. Valve members 258 and 262 move away from their respective seats at 266 and 268, and valve members 260 and 264 subsequently seat at 270 and 272, respectively. This reverses the connections at opposite ends of power cylinder 12c. The left end of the power cylinder is now connected to atmosphere through chambers 244 and 236, while the right end of the power cylinder is now connected to vacuum through chambers 248 and 232. The power cylinder piston is caused to move toward the right, applying the brakes through levers 88 and 92 and cable 118. The arrangement of switch 230 is such that it only remains closed as long as the operator pushes on the button. As soon as the operator relieves his pressure, the switch opens, and solenoid 229 is deenergized. However, there is no force tending to move rod 252 toward the left, and the valve elements of the solenoid operated valve therefore remain in the brake applying position. If the motor is shut off and the vacuum thereby destroyed, the levers 88—92—104 and the roller associated therewith will retain the brakes applied, as heretofore explained.

Switch 224 is connected to the system of levers in such a way that, when the lever assembly is in its released position (i. e. toward the left) the switch remains open. However, when the lever assembly has been rotated in a counterclockwise direction to its applied position (i. e. toward the right) the switch 224 is closed and remains closed until the levers have moved back to their original, or released, position. Switch 224 is shown as linked to lever 104, although it could be operated by any of the three levers 88, 92 and 104. Although switch 224 is closed when the levers are in applied position, switch 226 remains open as long as the accelerator treadle 274 remains in released position.

As soon as accelerator treadle 274 is moved downwardly, switch 226 closes, completing the circuit to solenoid 222. Energization of solenoid 222 draws armature 254 and rod 252 back toward the left returning valve elements 258, 260, 262 and 264 to their original positions, and again connecting the left end of the power cylinder to vacuum and the right end of the power cylinder to atmosphere. The power cylinder piston moves toward the left, causing the brakes to be released. By the time the levers 88, 92 and 104 reach released position, switch 224 is again open, thereby breaking the electrical circuit and deenergizing solenoid 222. However, the parts of the solenoid control valve remain in the leftward position, until solenoid 229 is again energized.

It will be seen from the foregoing description that the arrangement of the solenoid control valve and electrical circuits of Figures 5 and 6 is such as to insure only temperary energization of the solenoids 222 and 229, thereby avoiding an undue drain on the battery. Furthermore, it will be seen that the parking brake can be used as a "no-back brake," because the operator by touching the button switch 230 can cause the brakes to hold, and the brakes will automatically be released whenever the accelerator treadle is depressed. Such a control arrangement is valuable as a "hill holder" or "anti-creep" when it is desired to maintain the brakes applied without holding down the brake pedal.

Figure 7:
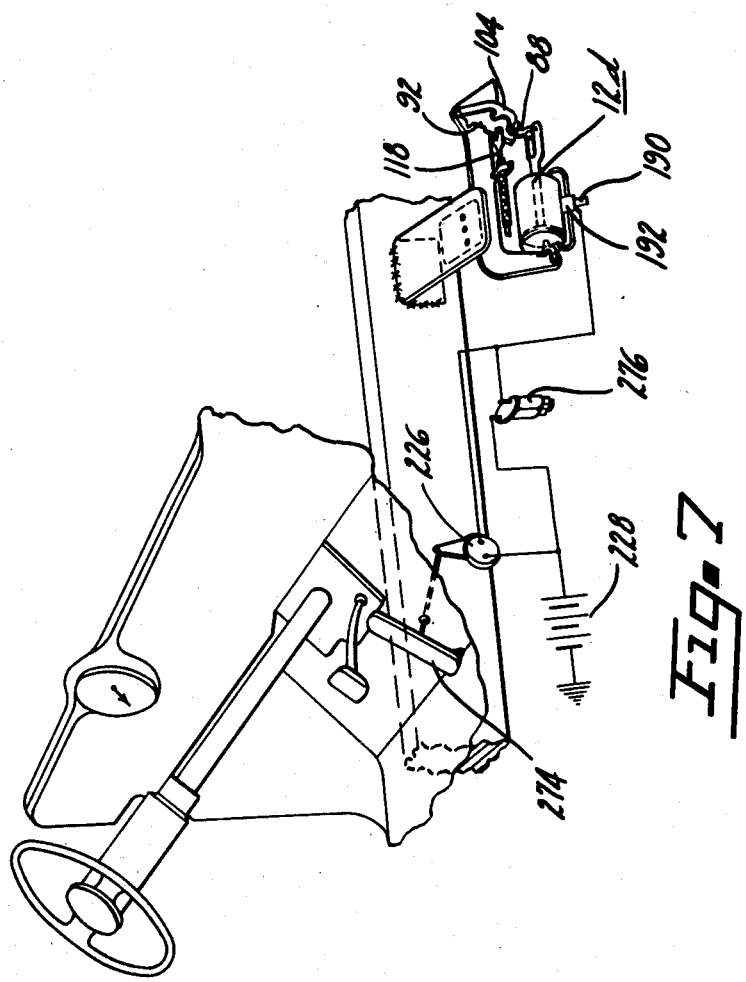
Figure 7 is a diagrammatic showing of a still further modification of the power parking brake arrangement.

Figure 7 shows an electrically controlled parking brake actuating system which is completely automatic in operation. Two electrical circuits are provided, both of which include the battery 228, and both of which include the solenoid 199. The switch 226 operated by the accelerator treadle is connected in one of the electrical circuits, in parallel arrangement with the governor operated switch 276, which controls the second circuit. The governor switch 276 is so arranged that it is open when the vehicle is at rest and is closed whenever the vehicle is moving. The accelerator switch 226 is so arranged that it is open when the accelerator treadle 274 is fully released and is closed at all other times.

The solenoid 190 and the control valve 192 which it operates are the same as the solenoid operated valve shown in section in Figure 4. As long as the solenoid is energized, the control valve 192 causes the power cylinder 12d to remain in released position.

Whenever the vehicle is moving, or the accelerator treadle 274 is depressed, either switch 276 or switch 226 will remain closed, causing solenoid 190 to be energized. The power cylinder piston therefore remains at its leftward position, and the brakes remain released. When the accelerator treadle is released, switch 226 opens, and when the vehicle is brought to a stop, switch 276 opens. When both circuits are broken in this manner, solenoid 190 is deenergized, and valve 192 is caused by its return spring to connect the left end of the power cylinder to atmosphere and the right end of the power cylinder to vacuum. The power cylinder piston therefore moves on its applying stroke, actuating the brakes through levers 88 and 92 and cable 118. When the power cylinder ceases to exert an applying force on the brakes, they will nevertheless be held applied by means of the levers 88, 92 and 104. As soon as switch 226 is closed by depressing treadle 274, solenoid 190 will again be energized, causing the brakes to be released. Thereafter, once the vehicle has begun to move, even though the accelerator treadle is released, the brakes will not again be automatically applied until switch 276 has been opened by bringing the vehicle to a full stop.

From the foregoing, it will be seen that several versions of a power operated emergency brake have been provided, the arrangements being such that back and forth movements of the power cylinder piston either apply the brakes or release the automatic brake locking device. Furthermore, means have been provided for regulating the power device which operates the emergency brakes either partially or wholly by automatic controls.

Although several embodiments of the invention have been illustrated and described, various changes in the form and relative arrangements of the parts may be made to suit requirements.

I claim:

1. For use in a vehicle having parking brake applying means and means for automatically and positively locking the parking brake applying means in applied position, in combination, a member movable in one direction to actuate the parking brake applying means and movable in the opposite direction to release the automatic locking means, a power device having a piston therein operatively connected with said member to control its movements in both directions, valve means arranged to control operation of the power piston, electro-magnetic means arranged to actuate said valve means, and a switch under the control of the operator and in the same electrical circuit as the electro-magnetic means, said switch being operable to cause said locking means to be selectively actuated and released.

2. For use in a vehicle having parking brake applying means and means for automatically locking the parking brake applying means in applied position, in combination, a member movable in one direction to actuate the parking brake applying means and movable in the opposite direction to release the automatic locking means, a power device having a piston therein operatively connected with said member to control its movements in both directions, valve means arranged to control operation of the power piston, electro-magnetic means arranged to actuate said valve means, a first switch under the control of the operator and arranged to control in part the operation of said electro-magnetic means for moving said valve means in a direction to cause actuation of said locking means, and a second switch responsive to the speed of the vehicle and arranged to prevent the operation of said locking means except when the vehicle speed is zero.

3. For use in a vehicle having a control member, parking brake applying means, and means for automatically locking the parking brake applying means in applied position, in combination, a member movable in one direction to actuate the parking brake applying means and movable in the opposite direction to release the automatic locking means, a power device having a piston therein operatively connected with said member to control its movements in both directions, valve means arranged to control operation of the power piston, electro-magnetic means arranged to actuate said valve means, a first switch responsive to movement of the vehicle control member and arranged to control in part the operation of said electro-magnetic means for moving said valve means in a direction to cause actuation of said locking means, and a second switch responsive to the speed of the vehicle and arranged to prevent the operation of said locking means for any vehicle speed above zero.

4. For use in a vehicle having a control member, parking brake applying means, and means for automatically and positively locking the parking brake applying means in applied position, in combination, a member movable in one direction to actuate the parking brake applying means and movable in the opposite direction to release the automatic locking means, a power device having a piston therein operatively connected with said member to control its movements in both directions, floating valve means arranged to control operation of the power piston, a switch operable to cause momentary energization of said electro-magnetic means whereby said valve will be operated to cause said locking means to be actuated, electro-magnetic means arranged to actuate said valve means, and a switch responsive to movement of the vehicle control member and in the same electrical circuit as the electro-magnetic means, whereby said locking means may be released upon operation of said vehicle control member.

5. For use in a vehicle having an accelerator control member, parking brake applying means, and means for automatically locking the parking brake applying means in applied position, in combination, a member movable in one direction to actuate the parking brake applying means and movable in the opposite direction to release the automatic locking means, a power device having a piston therein operatively connected with said member to control its movements in both directions, floating valve means arranged to control operation of the power piston, electro-magnetic means arranged to actuate said valve means, a first switch responsive to movement of the accelerator control member and operable to cause momentary energization of said electro-magnetic means to cause release of said locking means, and a second switch directly actuated by the operator and operable to cause momentary energization of said electro-magnetic means to cause actuation of said locking means.

6. For use in a vehicle having an accelerator control member, parking brake applying means, and means for automatically locking the parking brake applying means in applied position, in combination, a member movable in one direction to actuate the parking brake applying means and movable in the opposite direction to release the automatic locking means, a power device having a piston therein operatively connected with said member to control its movements in both directions, floating valve means arranged to control operation of the power piston, electro-magnetic means arranged to actuate said valve means, a first switch responsive to movement of the accelerator control member and arranged to control in part the operation of said electro-magnetic means, a second switch directly actuated by the operator and arranged to control in part the operation of said electro-magnetic means, and a third switch controlled by the position of the power piston and arranged to control in part the operation of said electro-magnetic means.

EARL R. PRICE.

References Cited in the file of this patent

UNITED STATES PATENTS

| Number | Name | Date |
|---|---|---|
| 2,031,062 | Peabody | Feb. 18, 1936 |
| 2,130,892 | Morphet | Sept. 20, 1938 |
| 2,532,357 | Callender | Dec. 5, 1950 |